(12) United States Patent
Arce

(10) Patent No.: US 6,605,878 B1
(45) Date of Patent: Aug. 12, 2003

(54) POWER FAILURE TRANSFER SWITCHING SYSTEM

(76) Inventor: Augusto Arce, 5825 SW. 163rd St. Rd., Ocala, FL (US) 34473

( * ) Notice: Subject to any disclaimer, the term of this patent is extended or adjusted under 35 U.S.C. 154(b) by 0 days.

(21) Appl. No.: 09/999,158

(22) Filed: Nov. 30, 2001

(51) Int. Cl.[7] .................................................. H02J 7/00
(52) U.S. Cl. ............................. 307/64; 307/70; 307/85
(58) Field of Search ............................. 307/64, 43, 85, 307/70

(56) References Cited

U.S. PATENT DOCUMENTS

| | | | |
|---|---|---|---|
| 3,944,837 A | * | 3/1976 | Meyers et al. ............ 290/40 R |
| 4,703,191 A | | 10/1987 | Ferguson |
| 5,264,732 A | | 11/1993 | Fiorina et al. |
| 5,268,850 A | | 12/1993 | Skoglund |
| 5,734,239 A | | 3/1998 | Turner |
| 5,903,065 A | | 5/1999 | Dragos |
| D417,651 S | | 12/1999 | Ohsumi |
| 6,172,432 B1 | * | 1/2001 | Schnackenberg et al. ..... 307/23 |

* cited by examiner

*Primary Examiner*—Brian Sircus
*Assistant Examiner*—Sharon A. Polk

(57) ABSTRACT

A power failure transfer switching system for monitoring incoming line voltages and switching to auxiliary sources as required. The power failure transfer switching system includes a voltage monitoring assembly designed for monitoring the levels of an incoming ac supply circuit, a power generating assembly for supplying an auxiliary source of ac power when the voltage monitoring assembly detects an inadequacy in supply from the incoming ac supply circuit, and a control assembly operationally coupled to the voltage monitoring assembly and to the power generating assembly for operating the power generating assembly when the voltage monitoring assembly detects an inadequacy in supply.

12 Claims, 3 Drawing Sheets

POWER FAILURE TRANSFER SWITCHING SYSTEM

BACKGROUND OF THE INVENTION

1. Field of the Invention

The present invention relates to automatic power switches and more particularly pertains to a new power failure transfer switching system for monitoring incoming line voltages and switching to auxiliary sources as required.

2. Description of the Prior Art

The use of automatic power switches is known in the prior art. More specifically, automatic power switches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,734,239; U.S. Pat. No. 5,268,850; U.S. Pat. No. 5,903,065; U.S. Pat. No. 5,264,732; U.S. Pat. No. 4,703,191; and U.S. Pat. No. Des. 417,651.

While these devices fulfill their respective, particular objectives and requirements, the aforementioned patents do not disclose a new power failure transfer switching system. The inventive device includes a voltage monitoring assembly designed for monitoring the levels of an incoming ac supply circuit, a power generating assembly for supplying an auxiliary source of ac power when the voltage monitoring assembly detects an inadequacy in supply from the incoming ac supply circuit, and a control assembly operationally coupled to the voltage monitoring assembly and to the power generating assembly for operating the power generating assembly when the voltage monitoring assembly detects an inadequacy in supply.

In these respects, the power failure transfer switching system according to the present invention substantially departs from the conventional concepts and designs of the prior art, and in so doing provides an apparatus primarily developed for the purpose of monitoring incoming line voltages and switching to auxiliary sources as required.

SUMMARY OF THE INVENTION

In view of the foregoing disadvantages inherent in the known types of automatic power switches now present in the prior art, the present invention provides a new power failure transfer switching system construction wherein the same can be utilized for monitoring incoming line voltages and switching to auxiliary sources as required.

The general purpose of the present invention, which will be described subsequently in greater detail, is to provide a new power failure transfer switching system apparatus and method which has many of the advantages of the automatic power switches mentioned heretofore and many novel features that result in a new power failure transfer switching system which is not anticipated, rendered obvious, suggested, or even implied by any of the prior art automatic power switches, either alone or in any combination thereof.

To attain this, the present invention generally comprises a voltage monitoring assembly designed for monitoring the levels of an incoming ac supply circuit, a power generating assembly for supplying an auxiliary source of ac power when the voltage monitoring assembly detects an inadequacy in supply from the incoming ac supply circuit, and a control assembly operationally coupled to the voltage monitoring assembly and to the power generating assembly for operating the power generating assembly when the voltage monitoring assembly detects an inadequacy in supply.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power failure transfer switching system apparatus and method which has many of the advantages of the automatic power switches mentioned heretofore and many novel features that result in a new power failure transfer switching system which is not anticipated, rendered obvious, suggested, or even implied by any of the prior art automatic power switches, either alone or in any combination thereof.

It is another object of the present invention to provide a new power failure transfer switching system which may be easily and efficiently manufactured and marketed.

It is a further object of the present invention to provide a new power failure transfer switching system which is of a durable and reliable construction.

An even further object of the present invention is to provide a new power failure transfer switching system which is susceptible of a low cost of manufacture with regard to both materials and labor, and which accordingly is then susceptible of low prices of sale to the consuming public, thereby making such power failure transfer switching system economically available to the buying public.

Still yet another object of the present invention is to provide a new power failure transfer switching system which provides in the apparatuses and methods of the prior art some of the advantages thereof, while simultaneously overcoming some of the disadvantages normally associated therewith.

Still another object of the present invention is to provide a new power failure transfer switching system for monitoring incoming line voltages and switching to auxiliary sources as required.

Yet another object of the present invention is to provide a new power failure transfer switching system which includes a voltage monitoring assembly designed for monitoring the levels of an incoming ac supply circuit, a power generating assembly for supplying an auxiliary source of ac power when the voltage monitoring assembly detects an inadequacy in supply from the incoming ac supply circuit, and a control assembly operationally coupled to the voltage monitoring assembly and to the power generating assembly for operating the power generating assembly when the voltage monitoring assembly detects an inadequacy in supply.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
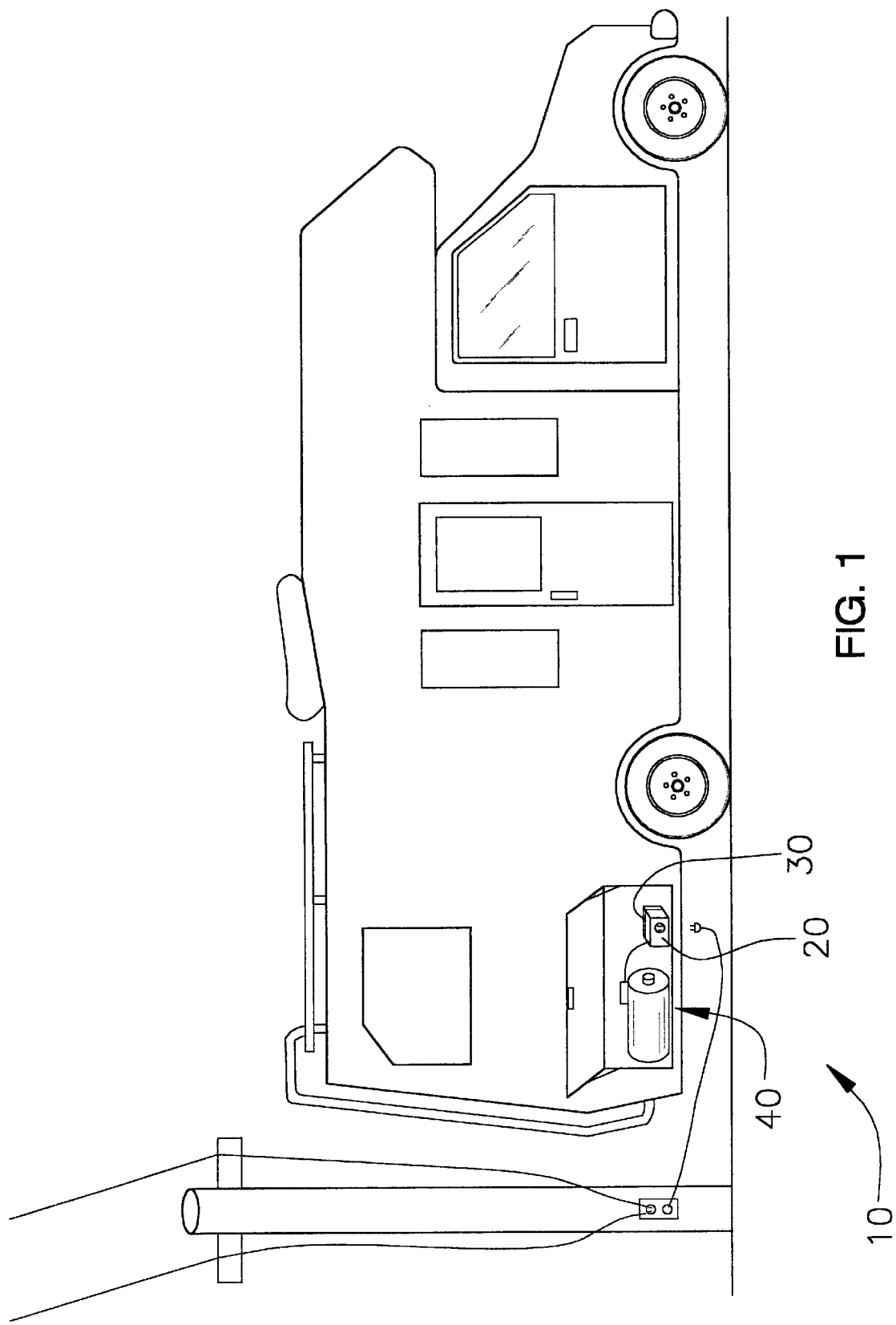
FIG. 1 is a schematic perspective view of a new power failure transfer switching system in use according to the present invention.
Figure 2:
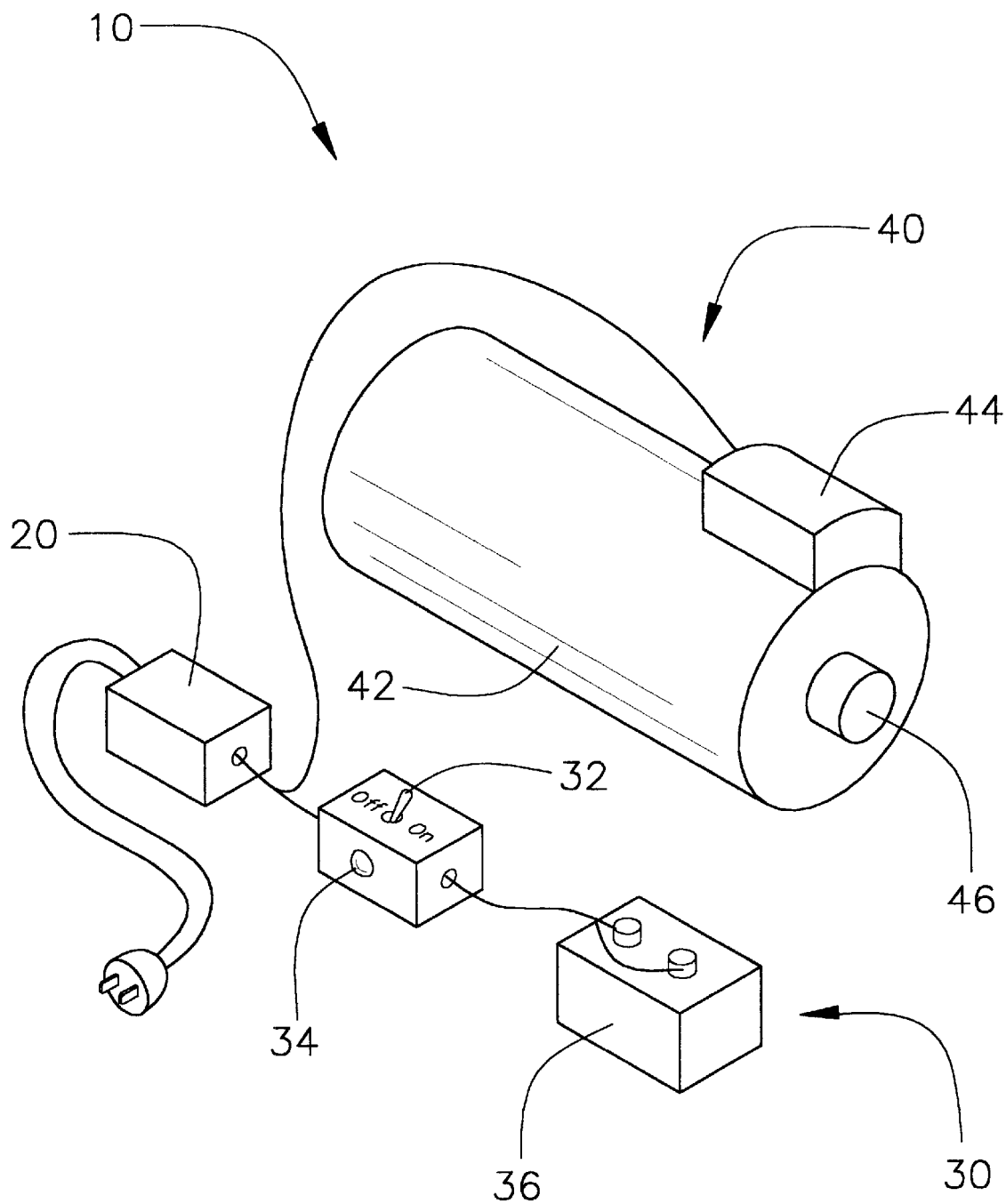
FIG. 2 is a schematic perspective view of the present Invention.
Figure 3:
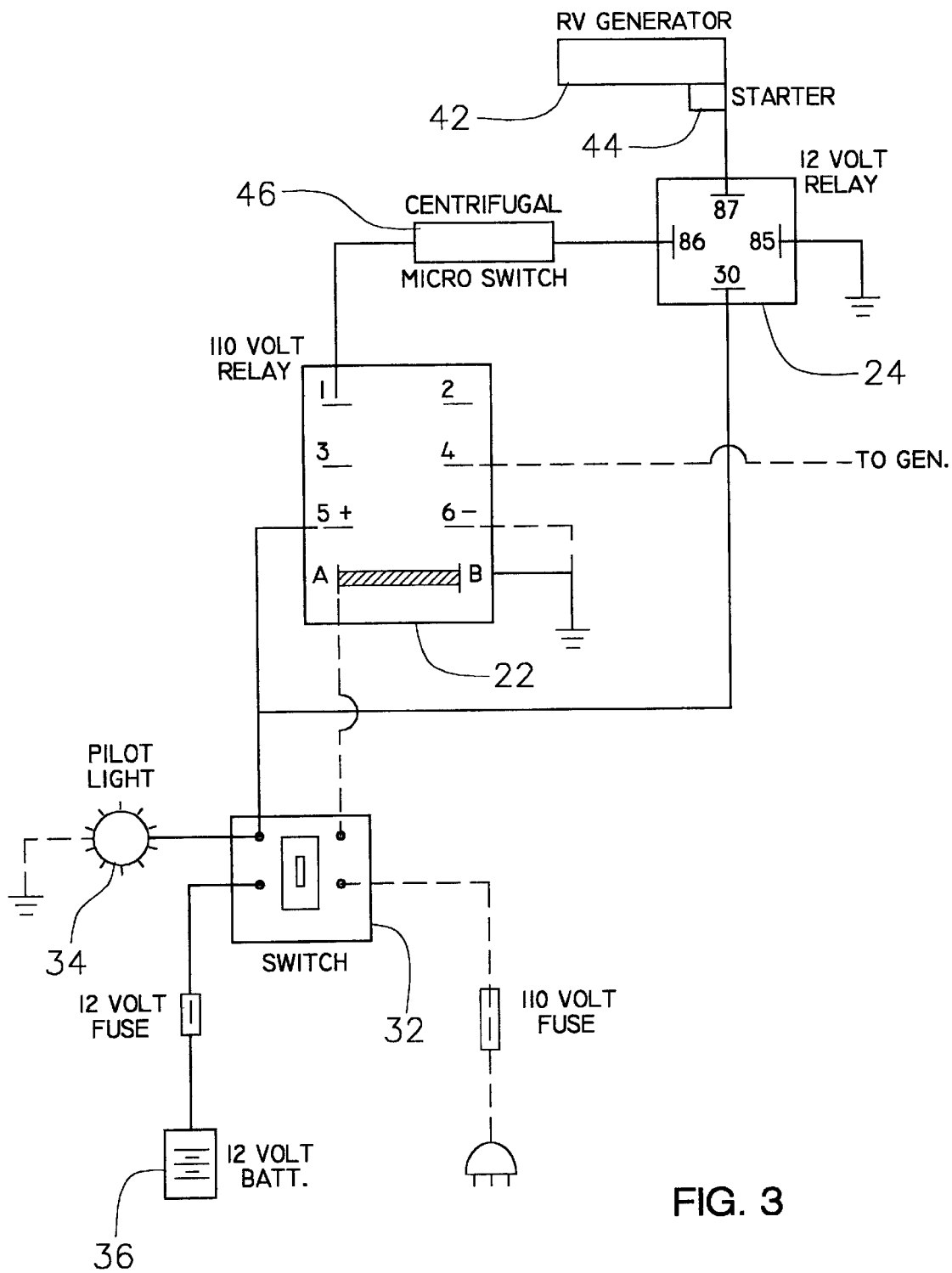
FIG. 3 is a schematic signal flow diagram view of the present invention.

With reference now to the drawings, and in particular to FIGS. 1 through 3 thereof, a new power failure transfer switching system embodying the principles and concepts of the present invention and generally designated by the reference numeral 10 will be described.

As best illustrated in FIGS. 1 through 3, the power failure transfer switching system 10 generally comprises a voltage monitoring assembly 20, a power generating assembly 40, and a control assembly 30.

The voltage monitoring assembly 20 is designed for monitoring the levels of an incoming ac supply circuit. The power generating assembly 40 is for supplying an auxiliary source of ac power when the voltage monitoring assembly 20 detects an inadequacy in supply from the incoming ac supply circuit.

The control assembly 30 is operationally coupled to the voltage monitoring assembly 20 and to the power generating assembly 40. The control assembly 30 is for operating the power generating assembly 40 when the voltage monitoring assembly 20 detects an inadequacy in supply.

The generator assembly 40 further comprises a generator 42, a starter 44, and a centrifugal switch 46. The generator 42 is for generating an auxiliary supply of ac voltage.

The starter 44 is operationally coupled to the generator 42. The starter 44 is for starting the operation of the generator 42 when the voltage monitoring system 20 detects an inadequacy of supply.

The centrifugal switch 46 is coupled to the generator 42 such that when a shaft of the generator 42 reaches a predetermined rate of revolutions the centrifugal switch 46 disengages the starter 44 from the generator 42. The centrifugal switch 46 is used to prevent damage to the starter 44 when the generator 42 reaches operational speeds.

The monitoring assembly 20 further comprises a ac-dc transfer circuit relay 22 designed for monitoring the presence of ac line voltage. The ac-dc transfer circuit relay 22 is operationally coupled to the generator assembly 40 such that when the ac-dc transfer circuit relay 22 detects an absence of ac line voltage the generator assembly 40 is turned on.

In an embodiment the ac-dc transfer circuit relay 22 comprises a relay 22 such that when ac line voltage is removed the relay 22 sends a signal to the generator assembly 40 to start.

In an embodiment the control assembly 30 further comprises a main switch 32, a lamp member 34, and a battery member 36.

The main switch 32 is used for enabling and disabling the power failure transfer switch system 10 such that the power failure transfer switch system 10 only operates when the main switch 32 is in an enabled state.

The lamp member 34 is coupled to the main switch 32 such that when the main switch 32 is in an enabled state the lamp member 34 illuminates.

The battery member 36 is for providing a dc voltage to operate the control assembly 30, the monitoring assembly 20, and the starter 44 coupled to the generator assembly 40. The battery member 36 facilitates operation when the ac line voltage is interrupted.

A dc relay 24 operationally coupled to the monitoring assembly 20. The dc relay 24 is used to terminate operation of the generator assembly 40 when ac line voltage is reestablished into the monitoring assembly 20.

In a further embodiment the lamp member 34 is positioned next to the switch.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power failure transfer switching system for use in conjunction with recreational vehicles, boats, and other transportable shelters comprising:

a voltage monitoring assembly adapted for monitoring the levels of an incoming ac supply circuit;

a power generating assembly for supplying an auxiliary source of ac power when said voltage monitoring assembly detects an inadequacy in supply from the incoming ac supply circuit;

a control assembly operationally coupled to said voltage monitoring assembly and to said power generating assembly, said control assembly being for operating said power generating assembly when said voltage monitoring assembly detects an inadequacy in supply;

wherein said control assembly further comprises:
  a main switch for enabling and disabling said power failure transfer switch system such that said power failure transfer switch system only operates when said main switch is in an enabled state;
  a lamp member coupled to said main switch such that when said main switch is in an enabled state said lamp member illuminates;
  a battery member for providing a dc voltage to operate said control assembly, said monitoring assembly, and a starter coupled to said generator assembly, said battery member facilitating operation when the ac line voltage is interrupted.

2. The power failure transfer switch system of claim 1, wherein said generator assembly further comprises:
  a generator for generating an auxiliary supply of ac voltage;
  a starter operationally coupled to said generator, said starter being for starting the operation of said generator when said voltage monitoring system detects an inadequacy of supply.

3. The power failure transfer switch system of claim 2, wherein said generator assembly further comprises:
  a centrifugal switch coupled to said generator such that when a shaft of said generator reaches a predetermined rate of revolutions said centrifugal switch disengages said starter from said generator; said centrifugal switch being used to prevent damage to said starter when said generator reaches operational speeds.

4. The power failure transfer switch system of claim 1, wherein said monitoring assembly further comprises:
  a ac-dc transfer circuit relay adapted for monitoring the presence of ac line voltage, said ac-dc transfer circuit relay being operationally coupled to said generator assembly such that when said ac-dc transfer circuit relay detects an absence of ac line voltage said generator assembly is turned on.

5. The power failure transfer switch system of claim 4, wherein said ac-dc transfer circuit relay comprises a relay such that when ac line voltage is removed said relay sends a signal to said generator assembly to start.

6. The power failure transfer switch system of claim 1, wherein said control assembly further comprises:
  a dc relay operationally coupled to said monitoring assembly, said dc relay being used to terminate operation of said generator assembly when ac line voltage is reestablished into said monitoring assembly.

7. A power failure transfer switching system for use in conjunction with recreational vehicles, boats, and other transportable shelters comprising:
  a voltage monitoring assembly adapted for monitoring the levels of an incoming ac supply circuit;
  a power generating assembly for supplying an auxiliary source of ac power when said voltage monitoring assembly detects an inadequacy in supply from the incoming ac supply circuit;

a control assembly operationally coupled to said voltage monitoring assembly and to said power generating assembly, said control assembly being for operating said power generating assembly when said voltage monitoring assembly detects an inadequacy in supply;

said generator assembly further comprises:
  a generator for generating an auxiliary supply of ac voltage;
  a starter operationally coupled to said generator, said starter being for starting the operation of said generator when said voltage monitoring system detects an inadequacy of supply;
  a centrifugal switch coupled to said generator such that when a shaft of said generator reaches a predetermined rate of revolutions said centrifugal switch disengages said starter from said generator; said centrifugal switch being used to prevent damage to said starter when said generator reaches operational speeds;

said monitoring assembly further comprises a ac-dc transfer circuit relay adapted for monitoring the presence of ac line voltage, said ac-dc transfer circuit relay being operationally coupled to said generator assembly such that when said ac-dc transfer circuit relay detects an absence of ac line voltage said generator assembly is turned on;

wherein said ac-dc transfer circuit relay comprises a relay such that when ac line voltage is removed said relay sends a signal to said generator assembly to start;

wherein said control assembly further comprises:
  a main switch for enabling and disabling said power failure transfer switch system such that said power failure transfer switch system only operates when said main switch is in an enabled state;
  a lamp member coupled to said main switch such that when said main switch is in an enabled state said lamp member illuminates;
  a battery member for providing a dc voltage to operate said control assembly, said monitoring assembly, and a starter coupled to said generator assembly, said battery member facilitating operation when the ac line voltage is interrupted;
  a dc relay operationally coupled to said monitoring assembly, said dc relay being used to terminate operation of said generator assembly when ac line voltage is reestablished into said monitoring assembly.

8. A power failure transfer switching system for use in conjunction with recreational vehicles, boats, and other transportable shelters comprising:
  a voltage monitoring assembly adapted for monitoring the levels of an incoming ac supply circuit;
  a power generating assembly for supplying an auxiliary source of ac power when said voltage monitoring assembly detects an inadequacy in supply from the incoming ac supply circuit;
  a control assembly operationally coupled to said voltage monitoring assembly and to said power generating assembly, said control assembly being for operating said power generating assembly when said voltage monitoring assembly detects an inadequacy in supply;

wherein said control assembly further comprises:
  a dc relay operationally coupled to said monitoring assembly, said dc relay being used to terminate operation of said generator assembly when ac line voltage is reestablished into said monitoring assembly.

9. The power failure transfer switch system of claim 8, wherein said generator assembly further comprises:

a generator for generating an auxiliary supply of ac voltage;

a starter operationally coupled to said generator, said starter being for starting the operation of said generator when said voltage monitoring system detects an inadequacy of supply.

10. The power failure transfer switch system of claim 9, wherein said generator assembly further comprises:

a centrifugal switch coupled to said generator such that when a shaft of said generator reaches a predetermined rate of revolutions said centrifugal switch disengages said starter from said generator; said centrifugal switch being used to prevent damage to said starter when said generator reaches operational speeds.

11. The power failure transfer switch system of claim 8, wherein said monitoring assembly further comprises:

a ac-dc transfer circuit relay adapted for monitoring the presence of ac line voltage, said ac-dc transfer circuit relay being operationally coupled to said generator assembly such that when said ac-dc transfer circuit relay detects an absence of ac line voltage said generator assembly is turned on.

12. The power failure transfer switch system of claim 11, wherein said ac-dc transfer circuit relay comprises a relay such that when ac line voltage is removed said relay sends a signal to said generator assembly to start.

* * * * *